Nov. 11, 1958 G. NICKLISS ET AL 2,860,020
FOOD CARRYING CART FOR AIRPLANES
Filed Feb. 21, 1957 2 Sheets-Sheet 1
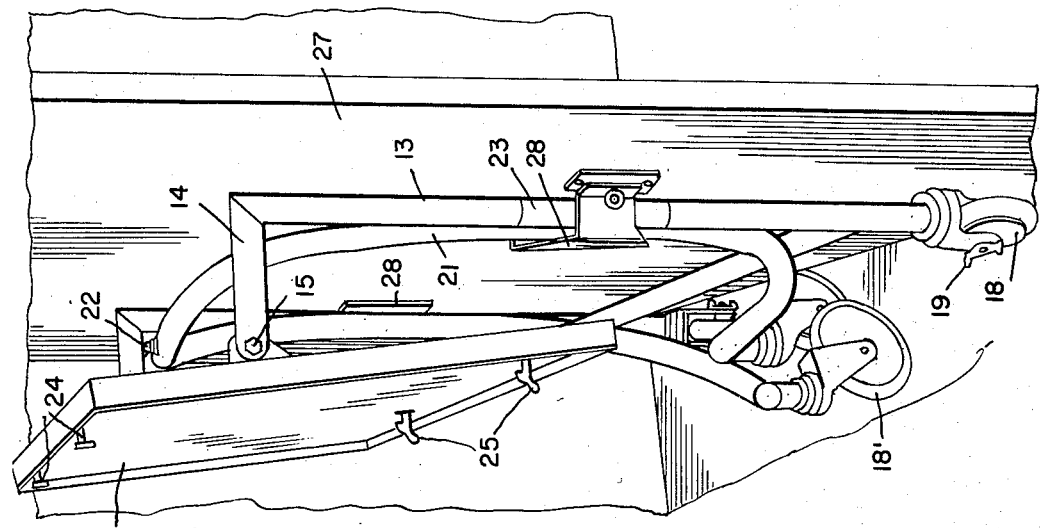
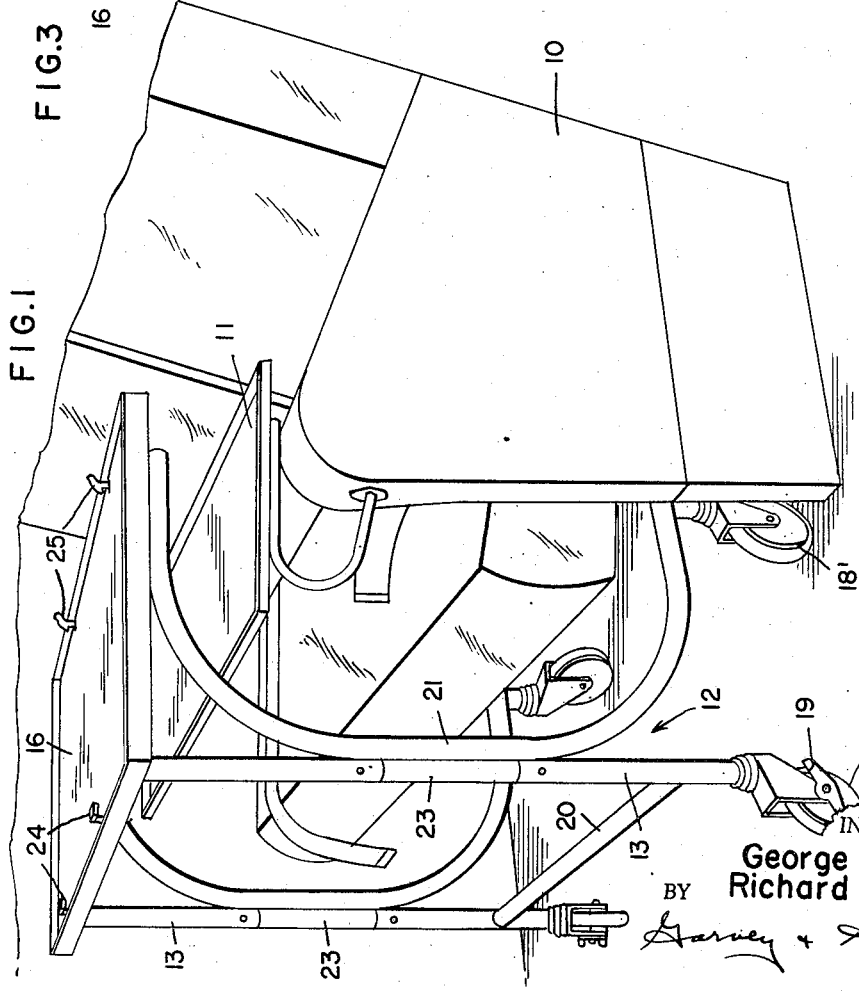
INVENTORS
George Nickliss
Richard P. Ensign
BY
ATTYS Nov. 11, 1958   G. NICKLISS ET AL   2,860,020
FOOD CARRYING CART FOR AIRPLANES
Filed Feb. 21, 1957   2 Sheets-Sheet 2

INVENTORS
George Nickliss
Richard P. Ensign

ATTYS

United States Patent Office 2,860,020
Patented Nov. 11, 1958

2,860,020

FOOD CARRYING CART FOR AIRPLANES

George Nickliss, Los Angeles, and Richard P. Ensign, Woodland Hills, Calif., assignors to Western Airlines, Inc., Los Angeles, Calif., a corporation of Delaware Application February 21, 1957, Serial No. 641,702

3 Claims. (Cl. 311—17)

The present invention is a food carrying cart for airplanes and has for an object the provision of a cart which will meet the high standards prescribed by the Civil Aeronautics Administration.

Other objects of this invention are to provide a cart with special leg construction to permit the cart to slide between the seats of conventional passenger airplanes to facilitate and expedite direct service of foods from the cart to the passenger food trays; to prevent the cart from bouncing and casual displacement even in case of severe turbulence; to provide a cart with maximum mobility to permit rapid clearing of the aisle in an emergency; and to provide a cart which may be folded and requires a minimum amount of space for stowing.

Other objects of the invention will be manifest from the following description of the present preferred form of the invention, taken in connection with the accompanying drawings, wherein:

Fig. 1 is a perspective view of a food carrying cart for airplanes constructed in accordance with the present invention, illustrating its application;

Fig. 3 is a side elevational view of the cart of the present invention in collapsed position, stowed against the wall of the airplane.

The device of this invention is presently in use in airplanes of Western Airlines and includes a conventional air plane passenger seat 10, adapted for the accommodation of two passengers. To further illustrate the application of the invention, there is shown a passenger food tray 11 which may be secured to the airplane seat for positioning immediately above the lap of a passenger or placed on the lap of a passenger in a manner well known in the art.

Figure 2:
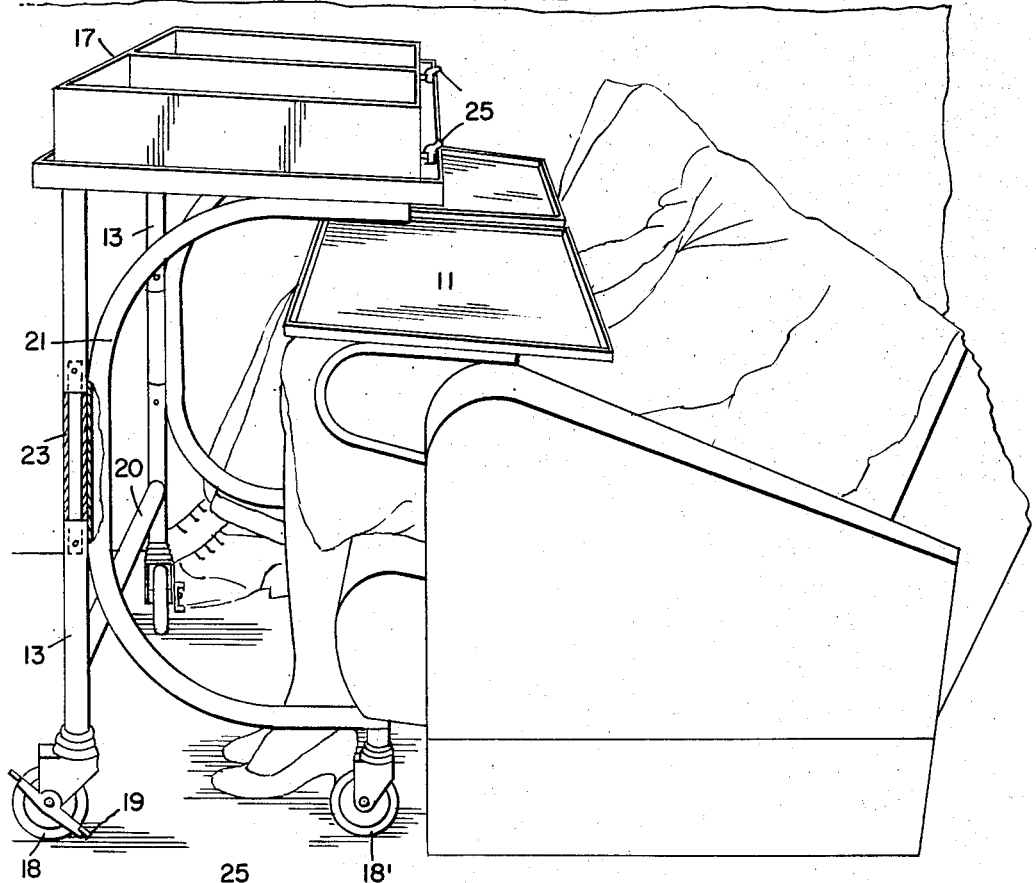
Fig. 2 is a similar view, partly in section, to disclose details, and showing the food service receptacles on the cart top.
Figure 4:
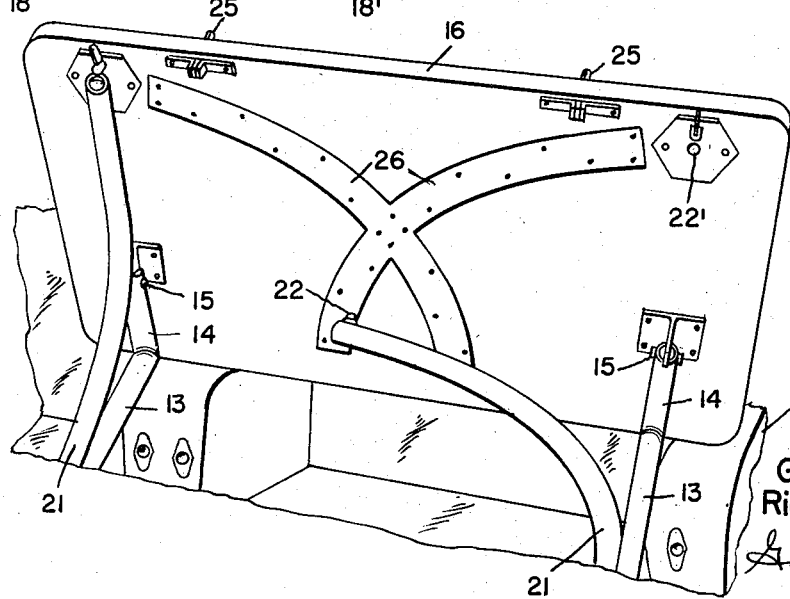
Fig. 4 is a perspective view looking at the bottom of the cart top, illustrating the manner of connecting the cart legs to the top, the legs being shown fragmentarily.

The device of this invention consists of a substantially K shape supporting frame 12 which includes a pair of vertical legs 13, the upper end of each leg being bent at right angles, as shown at 14 and hinged or pivoted as illustrated at 15, to the underface of a cart top 16, the latter being adapted for the reception of food service trays 17, which latter forms no part of the present invention. The bottom of each of the vertical legs 13 is equipped with mobile means 18 which, in the present instance, consists of caster wheels mounted in suitable frames, the latter carrying brakes 19 for use in anchoring the cart. The vertical legs are secured in predetermined spaced relation by an intermediate cross bar 20. In addition to the vertical legs, the frame also includes a pair of substantially C shape legs 21, the upper ends of which are detachably secured to the bottom of the cart top by conventional stud and socket fasteners 22 and 22'. It will be noted, upon reference to Fig. 4 of the drawings, that the upper horizontal part of the C leg is engaged with the cart top from a point adjacent the right angle terminal of its corresponding vertical leg to a point adjacent to the front edge of the top, to afford a substantial supporting area. The bottom of each C leg also carries mobile means indicated at 18' consisting of caster wheels mounted in suitable frames. When the cart is in use, the lower terminals of the C legs and their mobile means are disposed beneath the passenger seat as illustrated to advantage in Figs. 1 and 2. When in this position the cart top with the food service trays is positioned above the passenger tray in convenient proximity, so that the passenger may be served by the hostess, or may help himself to the contents of the food service trays.

The C shape legs 21 are pivotally connected to the vertical legs by elongated sleeves 23 which latter are welded or otherwise fixedly secured to vertical portions of the C legs, as illustrated in the drawing. This permits the C legs to be folded inwardly, for convenience in stowage, in a manner hereinafter more fully described.

The cart top is provided, adjacent its back edge, with any number of abutments 24, which latter coact with spring-pressed finger clips 25 in order to hold the food service trays on the cart top from accidental displacement.

As stated supra, the cart top 16 is hinged to the right angle terminals of the vertical legs and the C legs are detachably engaged to the cart top and movably connected to the vertical legs to permit collapsing of the cart when not in use, to allow stowing in a relatively narrow vertical space, as shown in Fig. 3.

In collapsing the cart, the fasteners 22, 22', are disconnected and the C legs relatively moved inwardly, which permits the cart top to fold downwardly into a substantially vertical plane, in parallel relation to the frame legs as also shown in Fig. 3. When in this position, the collapsed cart may be placed in contiguity to a vertical support such as indicated at 27 and held in this position by conventional strap brackets 28.

In order to prevent disfigurement of the underface of the cart top and to facilitate movement of the upper ends of the C legs into folded position, the bottom of the cart top is provided with arcuate guard plates 26 strategically positioned to insure wiping over of the upper ends of the C legs when the latter are moved into a collapsed position and then returned to a set-up position.

While a preferred embodiment of the invention has been shown and described, it is nevertheless to be understood that various changes may be made therein, without departing from the spirit and scope of the claims hereto appended.

What we claim is:

1. A food carrying cart for airplanes including a mobile supporting frame and a top adapted for the reception of food service receptacles, the frame comprising a pair of vertical legs intermediately connected to each other, the upper ends of the legs being disposed at right angles to engage the underface of the cart top, the free ends of said right angle portions being hinged to the top, a pair of curved legs supported by the vertical legs, the upper terminals of the curved legs being detachably engageable with the underface of the cart top, the lower terminals of said curved legs being adapted for positioning beneath a passenger seat on an airplane to simultaneously superpose the cart top over a passenger food tray supported by the seat or passenger, the curved legs being movable on the vertical legs to permit folding substantially within the confines of the vertical legs, the cart top being operable on its hinges to permit folding into substantially parallel relation with the legs, to permit stowage in a relatively narrow vertical space when the cart is not in use.

2. A food carrying cart for airplanes including a mobile supporting frame comprising spaced K-shape frames intermediately connected to each other, the angular part of each K-shape frame being pivotally connected to the vertical part thereof, and a supporting top hingedly connected to the upper terminal of the vertical part of each K-shape frame and detachably connected to the upper terminal of the angular part of each K-shape frame, to permit the top to be folded into substantially parallel relation with the vertical parts of the K-shape frames, and to permit the angular parts of the K-shape frames to be folded inwardly to a point substantially within the confines of the vertical parts.

3. A food carrying cart for airplanes including a mobile supporting frame and a top adapted for the reception of food service receptacles, the frame comprising a pair of vertical legs intermediately connected, the upper ends of the legs being disposed at right angles to engage the bottom of the cart top, the free ends of said right-angle portions being hinged to the top; a pair of substantially C-shaped legs being supported by the vertical legs, the upper portion of each C-shaped leg lying in a horizontal plane and detachably engageable with the bottom of the cart top from a point adjacent the right angle portion of the corresponding vertical leg to a point adjacent the front edge of the top, to afford a substantial supporting area, the lower terminals of said C-shaped legs being adapted for positioning beneath a passenger seat on an airplane to simultaneously superpose the cart top over a passenger food tray supported by the seat or passenger, the C-shaped legs being movable on the vertical legs to permit folding substantially within the confines of the vertical legs, the cart top being operable on its hinges to permit folding into substantially parallel relation with the vertical legs, to permit stowage in a relatively narrow vertical space when the cart is not in use.

References Cited in the file of this patent

UNITED STATES PATENTS

| | | |
|---|---|---|
| 1,901,174 | Kusterle | Mar. 14, 1933 |
| 2,183,410 | Scriven | Dec. 12, 1939 |
| 2,762,669 | Watson | Sept. 11, 1956 |

FOREIGN PATENTS

| | | |
|---|---|---|
| 485,020 | Great Britain | May 13, 1938 |